UNITED STATES PATENT OFFICE 2,168,985

PREPARATION OF IRON FREE COPPER SOLUTIONS

Sverre Gulbrandsen, Gloucester, N. J., assignor to New Process Rayon, Inc., Gloucester, N. J., a corporation of Delaware No Drawing. Application October 3, 1936, Serial No. 103,910

21 Claims. (Cl. 23—125)

The present invention relates to the purification of copper solutions and has as its main object the production of iron-free copper salts and other copper compounds.

The special object of the invention is the direct recovery of practically iron-free copper in the form of basic sulphate or copper-hydroxide from dilute waste solutions, particularly those occurring in the cuproammonium rayon process.

Still another object is to effect this recovery by fewer operations and more economically than it can be accomplished by methods heretofore practiced.

A short description of known methods will more clearly demonstrate the advantages of my invention.

It is known that the iron content of a copper solution can be materially reduced by partial precipitation with an alkali such as caustic soda, lime, ammonia, etc., if the iron is present as, or oxidized to the ferric state.

The proportionate increase in the iron content of the precipitate over its initial ratio to copper, however, grows less favorable with progressing dilution and is still further lowered by the presence of other electrolytes and impurities.

The above method is therefore inadequate for dilutions containing 1% or less of copper with higher percentages of sulphate of ammonia, sulphate of soda and free sulphuric acid and with traces of aluminum and magnesia salt, conditions such as we have to contend with for instance in treating waste liquors from the production of rayon according to the cuproammonium process, where seemingly negligible percentages of iron impair the color and the properties of the resulting synthetic fibers.

In such instances various proceedings are now practiced.

The copper is cemented out by scrap iron and is converted into copper oxide, or copper and iron are jointly precipitated as hyroxides or basic salts. The resulting crude copper tailings may be freed from iron either by digestion with an insufficient amount of acid or by partial precipitation of their solutions in acid, for which reaction conditions are then more favorable—though I have found neither one of these two methods as thorough and efficient for removal of iron as the one I have heretofore applied and which is disclosed in U. S. Patent No. 1,800,828 and U. S. Patent No. 1,867,357. According to that method the crude copper residues (basic sulphate or copperoxide) are dissolved in weak acids. To these copper solutions enough ammonia is added to dissolve the copper as tetramin compounds, while the iron precipitates and is filtered off. The copper content of the filtrate is finally isolated by known means as either insoluble basic salts or copper hydroxide.

It can be seen from the above description of current practices, that the necessity of lowering the iron content of crude copper solutions to the minimum which is required by the rayon industry, involves a number of extra operations and considerable expense for machinery, labor and chemicals.

Now I have found that introduction of a small amount of phosphoric acid or its salts, as conditions may require, followed by an alkali in excess of that required for precipitation of the iron only, the excess resulting in a partial precipitation of the copper in the solution, greatly assists in the separation of the copper from the iron, rendering such separation practically complete even in very dilute solutions and in the presence of other electrolytes.

To effect separation promptly it is preferable that the phosphoric acid be incorporated in and evenly distributed throughout the liquid before any precipitation occurs, and that it be added in a form not causing such precipitation.

Otherwise, the precipitation will show no immediate and distinct separation of the two metals, though results in this respect can be improved by prolonged agitation.

The later references to the example will further explain the above point.

It is an advantageous pre-requisite in carrying out the present invention that the iron content of the copper solution be in the ferric state for the partial precipitation. If this is not the case, prior application of a suitable oxidizing agent can be employed to bring it to the desired state.

The amount of phosphoric acid or phosphate to be added before partial precipitation, should be in excess of the chemical equivalent of the iron content of the liquid.

The quantity of alkali to be employed for partial precipitation must be sufficient for neutralizing the liquid and for precipitating all of its iron and a small percentage of its copper content.

In contrast to the procedure observed in partial precipitation without the presence of phosphoric acid, the precipitate forms and coagulates rapidly. With a higher percentage of alkali for precipitation it settles especially quickly and completely, so that it can be easily removed by filtration or decantation.

In practice, I therefore prefer to use for partial precipitation an amount of alkali equivalent to 5–7% of the copper content of the liquid, after taking into account what is necessary for neutralization and precipitation of iron. This is not a critical value. Quantities as low as 1% are sufficient for the purpose of separation.

The copper which falls with the iron due to excess alkali, in the partial precipitation is not wasted. Accumulations of such precipitates are treated with enough acid to recover substantially all of the copper, whereby due to the presence of the phosphoric acid radical in the precipitate all the iron is left behind.

This behaviour conforms with another phase of our invention based on the discovery that the presence of the phosphoric acid radical has the same beneficial effect on the separation of the metals in partial or selective digestion, as it has in partial precipitation.

Accordingly, the present invention permits to modify the procedure by varying the precipitation with respect to the relative amounts of the two metals, to the extent where it involves a large portion of both metals the separation of which to be finally effected by selective digestion with the aid of phosphoric acid or phosphates, added either before precipitation, or to the water suspended precipitate before digestion. The water-suspended precipitate in this case may be produced by the use of sufficient alkali to precipitate substantially all the copper and iron as hydroxides and/or basic sulphates.

In practice, this invention is carried out as follows:

EXAMPLE 1

250 kgs. of crude coppersulphate ($CuSO_4$—$5H_2O$)

containing 0.2% of iron (figured on metallic copper) and other impurities are dissolved in 5,000 liters of water.

To this solution, in which the iron is in the ferric state, 0.275 kg. of phosphoric acid is added and after some stirring for thorough distribution, a solution containing 4 kgs. of 100% caustic soda is added to effect partial precipitation.

After 20 minutes stirring, the precipitate which contains all the iron and impurities is allowed to settle.

The supernatent liquid is then drawn off and its copper content precipitated by known means as either basic coppersulphate or copper hydroxide, which after washing is suitable for the preparation of cuproammonium cellulose solutions for the manufacture of rayon. The copper remaining in the residue after partial precipitation may be regained as herein later described.

EXAMPLE 2

The waste acid solution obtained in the operation of the cuproammonium process for the manufacture of rayon, such as described in U. S. Patents Nos. 1,983,221 and 1,770,750, is collected in a large tank.

The composition of this waste acid solution per liter is approximately as follows:

| | Grams |
|---|---|
| Copper hydroxide as sulphate | 3.6 |
| Sulphuric acid | 1.00 |
| Ferric sulphate | 0.022 |
| Sulphate of soda | 10.00 |
| Sulphate of ammonia | 6.725 |
| Other sulphates (of magnesia aluminum) and silicates | .02 |

For reclaiming copper from this solution according to the present invention, I add for each 10,000 liters, 0.8 kg. trisodium-phosphate, and after a short mixing, 9.3 kgs. 100% caustic soda (as 20% solution).

After 20 minutes agitating, the precipitate is allowed to settle. This precipitate contains all of the iron in addition to about 4.5% of the copper hydroxide.

From the supernatent clear iron-free liquor which is drawn off, the copper is isolated as copper hydroxide by known means.

EXAMPLE 3

Recovery of copper by selective digestion of the partial precipitate.

1,000 kgs. of accumulated residue obtained from the partial precipitation, as carried out in any of the above examples, is suspended in 10,000 liters of water. It contains according to analysis as phosphates or hydroxides or basic sulphates:

| | Kilograms |
|---|---|
| Iron | 7.84 |
| Copper (both figured as metals) | 109 |

This precipitate contains phosphoric acid radical in excess of its equivalent to the iron content.

To this suspension 165 kgs. of sulphuric acid, 66° Baumé, suitably diluted, is added. It will be observed that this amount is substantially the chemical equivalent of the copper in the solution.

After 20 minutes stirring, the precipitate is allowed to settle. The resultant supernatent liquor then contains iron-free copper. This recovery by selective digestion is greatly benefited by the presence of the phosphoric acid radical which effects a more distinct separation between copper and iron.

EXAMPLE 4

*Application of phosphate for selective digestion*

1,000 kgs. of a paste, containing 295 kgs. of copper hydroxide and 11 kgs. of iron hydroxide, are suspended in water. Such a paste may be obtained by treating a crude copper sulphate with caustic. Enough sodium hypochlorite is added to oxidize all iron to the ferric state. Then a solution of 46 kgs. of disodiumphoshate ($PO_4NA_2H + 12H_2O$) is stirred in. Finally, 295 kgs. of sulphuric acid 66° Baumé are added. After some agitating the precipitate containing all the iron and a small percentage of copper, is allowed to settle. The supernatent iron-free liquor is worked up, as desired.

In Example 1, given above, I have a neutral solution of a copper salt. I add in this case phosphoric acid to leave the solution on the acid side, though it is understood that an equivalent effect may be obtained by acidifying with sulphuric acid and then adding sodium phosphate.

In Example 2 the solution contains free acid. I, therefore, add trisodiumphosphate which neutralizes part of the free acid. After this I treat with caustic for neutralizing the free acid and for partial precipitation. The use of tri-sodium phosphate effects a partial neutralization of the free acid and economizes in the use of caustic.

In my work I have utilized an equivalent of phosphoric acid, for example, pyro-phosphoric acid and/or arsenic acid and/or its salts. There are yet others which produce iron salts of the same relative insolubility in solutions of the acidity or that with which we are concerned. It might be said indeed, that an outstanding characteristic of such reagents is the relative insolubility of the iron salts which they form when functioning as described in the solution with which we are dealing, as compared with the solubility of copper salts also formed by the same reagents. The generic spirit of the invention extends to such modifications as these without any question.

While certain specific examples of the invention have been herein described in detail for the sake of disclosure, it is to be understood that various modifications thereof may be practiced using various equivalents of the reagents specified without departure from the spirit of invention and within the scope of the appended claims.

What I claim is:

1. The method of removing from waste solutions derived from re-generation of cellulose from its cupra-ammonium solutions the iron content, which such solutions gathered from portions of the system which are made of iron and with which it comes into contact, which iron exists in the ferric state in the solution in extremely small quantity, which method consists in adding to the solution a soluble phosphate at least the substantial chemical equivalent of the iron in the solution, the acidity of the solution at this point being such that the addition of the phosphate will cause no precipitating action, thoroughly agitating the mixture, thereupon adding alkali in a quantity sufficient not only to neutralize any free acid which may exist in the solution, but also to precipitate copper from the solution in quantity manifoldly greater than the iron in the solution, yet a relatively small percentage of the total copper, thoroughly agitating the mixture the while, thereupon separating the iron-free copper solution from the precipitate, and adding to the precipitate sufficient acid to dissolve the copper content, but not enough to dissolve an appreciable amount of the iron.

2. The method of removing the iron impurities from waste solutions obtained in the regeneration of cellulose from its cupra-ammonium solutions, which comprises adding and mixing .8 kilogram dry sodium phosphate to each 10,000 liters of waste solution containing per liter 5.9 grams copper sulphate, one gram of sulphuric acid and .022 gram ferric sulphate, all approximately, then adding 9.3 kilograms 100% caustic soda in a substantially 20% solution, agitating, permitting the precipitate to settle, and drawing off the supernatent liquor.

3. The method of removing the iron impurities from waste solutions obtained in the regeneration of cellulose from its cupra-ammonium solutions, which comprises adding and mixing .8 kilogram dry sodium phosphate, mixing to each 10,000 liters of waste solution containing per liter 5.9 grams copper sulphate, one gram of sulphuric acid and .022 gram ferric sulphate, all approximately, then adding 9.3 kilograms 100% caustic soda in a substantial 20% solution, agitating, permitting the precipitate to settle, and drawing off the supernatant liquor, and thereafter recovering from the residue the copper by suspending each thousand kilograms of such residue which contains 7.84 kilograms of iron and 109 kilograms of copper, in 10,000 liters of water and to such suspension introducing 165 kilograms of sulphuric acid at 66° Baumé, stirring the suspension and allowing the precipitate to settle, whereby the copper theretofore utilized in removing the iron from the main body of the waste solution is itself recovered in an iron-free solution.

4. The method of recovering iron-free copper solution from waste solutions containing ferric iron, obtained in the regeneration of cellulose from its cupro-ammonium solutions, which comprises adding a substance soluble in said waste solution and containing an acid radical of a pentavalent oxyacid of an element of the fifth group of the periodic system having an atomic weight above 14 to the solution, and then adding an alkali in excess of that required to precipitate all of the iron.

5. A method of recovering iron-free copper solution from waste solutions obtained in the regeneration of cellulose from its cuprammonium solutions, said waste solutions containing copper and ferric iron, which comprises adding a soluble phosphate in sufficient quantity to combine with all the iron, said waste solution having at this stage enough free acid which forms with iron a ferric salt much more insoluble in dilute acid than basic ferric sulphate, but which forms with copper a salt not substantially less soluble in dilute acid than basic copper sulphate to keep the phosphate in solution, and then adding an alkali in sufficient amount to precipitate all the iron and also a portion of the copper.

6. A method of recovering iron-free basic copper sulphate from waste solutions obtained in the regeneration of cellulose from its suprammonium solutions, said waste solutions containing copper and ferric iron, which comprises adding a soluble phosphate in sufficient quantity to combine with all the iron, said waste solution having at this stage enough free acid to keep the phosphate in solution, then adding an alkali in sufficient amount to precipitate all the iron and also a portion of the copper, separating the iron-free copper solution from the precipitate and adding an alkali to the iron-free solution to precipitate the copper as basic copper sulphate.

7. A method of recovering iron-free copper hydroxide from waste solutions obtained in the regeneration of cellulose from its suprammonium solutions, said waste solutions containing copper and ferric iron, which comprises adding a soluble phosphate in sufficient quantity to combine with all the iron, said waste solution having at this stage enough free acid to keep the phosphate in solution, then adding an alkali in sufficient amount to precipitate all the iron and also a portion of the copper, separating the iron-free copper solution from the precipitate and adding an alkali to the iron-free solution to precipitate the copper as basic copper sulphate, and treating the basic copper sulphate with an alkali for conversion to copper hydroxide.

8. The method of producing iron-free copper salt solution from a copper salt solution containing iron in the ferric state, which comprises adding a soluble phosphate to the solution in the presence of enough free acid to keep the phosphate in a soluble condition, said phosphate being sufficient to combine with all the iron content of the solution, and then adding an alkali in sufficient amount to precipitate all the iron and a portion of the copper.

9. The method of producing an iron-free copper salt solution from a copper salt solution containing iron in the ferric state, which comprises first adding and evenly distributing through the solution a soluble phosphate in an amount sufficient to combine with all the iron content of the solution, and thereafter effecting precipitation of the iron by the addition of an alkali in a sufficient amount to precipitate all the iron and a portion of the copper.

10. The method of producing an iron-free copper salt solution from a copper salt solution containing iron in the ferric state which comprises adding a soluble phosphate to the solution slightly in excess of the amount needed to combine with the iron content, and thereafter effecting precipitation of all the iron and part of the copper, by the addition of an alkali.

11. The method of producing an iron-free copper salt solution from a copper salt solution containing iron in the ferric state which comprises adding a soluble phosphate to the solution slightly in excess of the amount needed to combine with the iron content, and thereafter effecting precipitation of all the iron and a relatively small portion of the copper, by the addition of an alkali.

12. The method of producing an iron-free copper salt solution from a copper salt solution containing iron in the ferric state, which comprises adding to and evenly distributing throughout the solution a soluble phosphate in excess of the amount necessary to combine with the entire iron content of the solution, the acidity of the solution being enough to keep the phosphate in solution at this stage, then adding an alkali in an amount necessary to precipitate the entire iron content of the solution and a small part of the copper content, and separating the iron-free copper salt solution from the precipitate.

13. The method of producing an iron-free copper salt solution from an acid copper solution containing iron in the ferric state, which comprises adding to and evenly distributing throughout the solution, a soluble phosphate in a quantity sufficient to combine with the iron content, the solution being sufficiently acid to keep the phosphate in solution, adding an alkali in an amount sufficient to neutralize the solution and precipitate the entire iron content and a small percentage of the copper content of the solution, withdrawing the iron-free copper solution, adding to the residue an amount of acid sufficient to dissolve substantially all the copper content of the residue while leaving the iron insoluble, and withdrawing the iron-free copper solution.

14. The method of producing an iron-free copper salt solution from a copper precipitate containing iron in the ferric state, which comprises adding a soluble phosphate slightly in excess of the amount required to combine with the iron content of the precipitate, adding an amount of acid sufficient to dissolve the copper content of the precipitate but not sufficient to dissolve the iron.

15. The method of producing an iron-free copper solution from an aqueous mixture containing copper and iron in the ferric state, which comprises adding a soluble phosphate in an amount sufficient to combine with all of the iron, and bringing the pH value to a point where all the iron is obtained in the form of a precipitate of ferric phosphate, and the major part of the copper is obtained in a soluble form.

16. The method of producing an iron-free copper salt solution from a copper solution containing iron in the ferric state which comprises adding to the solution a substance soluble in the solution being treated and containing an acid radical of a pentavalent oxyacid of an element of the fifth group of the periodic system having an atomic weight above 14 in a quantity sufficient to combine with the iron content and capable of forming with iron a ferric salt much more insoluble in dilute acid than basic ferric sulphate but which forms with copper a salt not substantially less soluble in dilute acid than basic copper sulphate, thereafter adding to the solution when in acid condition an alkali in an amount sufficient to neutralize the solution and precipitate substantially the entire iron content and at least some of the copper content of the solution, and thereupon withdrawing the iron-free copper solution.

17. The method of producing an iron-free copper salt solution from an acid copper solution containing iron in the ferric state, which comprises adding a soluble phosphate to the solution in a quantity sufficient to combine with the iron content of the solution, then adding an alkali in an amount sufficient to neutralize the solution and precipitate all the iron and a portion of the copper, withdrawing the iron-free solution, and extracting the copper from the residue.

18. The method of removing from waste solutions derived from re-generation of cellulose from its cupro-ammonium solutions the iron content, which such solutions gathered from portions of the system which are made of iron and with which it comes into contact, which iron exists in the ferric state in the solution in extremely small quantity, which method consists in adding to the solution a soluble phosphate at least the substantial chemical equivalent of the iron in the solution, the acidity of the solution at this point being such that the addition of the phosphate will cause no precipitating action, thoroughly agitating the mixture, thereupon adding alkali in a quantity sufficient not only to neutralize any free acid which may exist in the solution, but also to precipitate copper from the solution in quantity manifoldly greater than the iron in the solution, yet a relatively small percentage of the total copper, thoroughly agitating the mixture the while, thereupon withdrawing the iron-free copper solution, and adding to the precipitate sufficient acid to dissolve the copper content, but not enough to dissolve an appreciable amount of the iron.

19. The method of producing iron-free copper solution from a solution containing copper and iron in the ferric state, which comprises adding a soluble compound containing an acid radical which forms with iron a ferric salt much more insoluble in dilute acid than basic ferric sulphate, but which forms with copper a salt not substantially less soluble in dilute acid than basic copper sulphate, this acid radical being added in sufficient quantity to combine with all of the iron, then adding an alkali in sufficient amount to precipitate the iron and a portion of the copper, and withdrawing the iron-free copper solution.

20. The method of producing an iron-free copper salt solution from a copper solution containing iron in the ferric state, which comprises adding to the solution a substance soluble in the solution being treated and containing an acid radical of a pentavalent oxyacid of an element of the fifth group of the periodic system having an atomic weight above 14 in a quantity sufficient to combine with the iron content and capable of forming with iron a ferric salt much more insoluble in dilute acid than basic ferric sulphate but which forms with copper a salt not substantially less soluble in dilute acid than basic copper sulphate, thereafter adding to the solution when in acid condition an alkali in an amount sufficient to neutralize the solution and precipitate substantially the entire iron content and a small percentage of the copper content of the solution and thereupon withdrawing the iron free copper solution, adding to the residue an amount of acid substantially the chemical equivalent of the copper content of the residue and withdrawing the resultant iron-free copper solution.

21. The method of producing an iron-free copper solution from an aqueous mixture containing copper and iron in the ferric state which comprises adding a soluble compound containing an acid radical which forms with iron a ferric salt much more insoluble in dilute acid than basic ferric sulphate but which forms with copper a salt not substantially less soluble in dilute acid than basic copper sulphate, this acid radical being added in sufficient quantity to combine with all the iron, and bringing the pH value to a point where all the iron is obtained in the form of a precipitate, and the major part of the copper is obtained in a soluble form.

SVERRE GULBRANDSEN.